United States Patent
Plumat et al.

[15] 3,639,198
[45] Feb. 1, 1972

[54] GLASS ARTICLES HAVING IMPROVED BREAKAGE CHARACTERISTICS

[72] Inventors: Emile Plumat, Gilly; Francois Toussaint, Lodelinsart; Jean Schottey, Montignies-Sur-Sambre, all of Belgium

[73] Assignee: Glaverbel S. A., Watermael-Boitsfort, Belgium

[22] Filed: Sept. 12, 1969

[21] Appl. No.: 857,568

[30] Foreign Application Priority Data

Aug. 15, 1969 Great Britain......................40,891/69

[52] U.S. Cl..............................161/43, 161/125, 161/165, 161/199, 296/84
[51] Int. Cl.........................................................B32b 17/06
[58] Field of Search.....................161/1, 192, 199, 165, 125; 65/30; 296/84

[56] References Cited

UNITED STATES PATENTS 3,287,200  11/1966  Hess et al...................................161/1
3,396,075  8/1968  Morris....................................161/199

FOREIGN PATENTS OR APPLICATIONS 1,018,890  2/1966  Great Britain............................65/30

*Primary Examiner*—John T. Goolkasian
*Assistant Examiner*—D. J. Fritsch
*Attorney*—Spencer & Kaye

[57] ABSTRACT

An article containing at least one glass sheet which has been chemically tempered to create tensile stresses in an internal zone thereof and compressive stresses in external layers thereof, the chemical tempering being carried out in such a manner that, for at least a portion of the sheets, the arithmetic product of the thickness of such internal zone and of the maximum tensile stress in such zone is within a given range of values for which the sheet will fracture into large fragments under the impact of a small projectile and will fracture into small noncutting fragments under an impact of a large body approximating a human being.

10 Claims, No Drawings

GLASS ARTICLES HAVING IMPROVED BREAKAGE CHARACTERISTICS

BACKGROUND OF THE INVENTION

The present invention relates to tempered glass articles and bodies.

It is known to temper glass articles to improve their tensile strength. The effect of tempering is to set up or increase compressive stresses in surface layers of the article. These compressive stresses are balanced by tensile stresses in the interior layers of the article.

Two types of tempering are generally employed: thermal tempering and chemical tempering. In thermal tempering the required stresses are established by heating the article and then rapidly cooling it. In chemical tempering, a substance is caused to enter the surface layers of the article from a contacting medium.

The present invention is concerned with glass which is chemically tempered. More specifically, the invention is concerned with glass which has been chemically tempered by a replacement of alkali ions initially in surface layers of the glass by larger alkali metal ions. The ion exchange may involve a replacement of sodium ions in surface layers of the glass by potassium ions provided by a contacting treatment medium. As is known per se, for such an ion exchange to effect a tempering of glass, the exchange must be performed at an elevated temperature which, however, is below that at which complete stress relaxation can occur in the time during which the elevated temperature is maintained.

When a sheet of tempered glass fractures as a result of impact, the glass divides into numerous small fragments which are so small that the article loses its transparency. This phenomenon is well known to motorists because thermally tempered glass sheets are in widespread use in vehicle windshields. Occasionally a windshield will break under the impact of stones thrown against it by the wheels of a vehicle ahead, and the resulting fragmentation causes a loss of forward vision through the windshield, with consequent increased chances of accident. To restore visibility, the glass fragments have to be removed over a given area leaving the driver and many passengers exposed to wind and rain. The windshield will shatter in a similar way if it breaks due to an occupant of the vehicle being thrown against it at the time of a collision or sudden stop. In this case the risk that the occupant will be ejected from the car is great.

In order to diminish such risks, laminated windshields have been proposed in which two sheets of untempered glass are united by means of a plastic intermediate layer. Nevertheless, such laminated windshields do not offer a complete solution to the problem because although there is less risk of ejection of the occupant, the head of the latter may pass through the windshield, the large cutting pieces of the two glass sheets forming a "collar" around his neck, and severely injuring or killing the occupant by the so-called "guillotine" effect.

SUMMARY OF THE INVENTION

It is a primary object of the present invention to eliminate these shortcomings.

Another object of the invention is to optimize the breakage characteristics of such glass sheets.

A further object of the invention is to provide a glass sheet with selective fracturing characteristics such that it will divide into large fragments, and thus continue to provide good visibility, when struck by a small projectile, and will divide into small noncutting fragments when struck by a large mass approximating a human being.

The present invention is based on the discovery that in the case of chemically tempered glass, if the chemical tempering is appropriately performed to achieve certain conditions relating to the magnitude of the maximum tensile stress and the thickness of the internal tensioned zone of the glass, the impact breakage characteristics of the glass are changed in an advantageous manner as a function of the body striking the glass. In particular, in the case of a vehicle windshield, if the glass breaks under the impact of a stone or similar "projectile" it will divide into pieces sufficiently large not to result in the forward vision being completely obscured, whereas if the glass breaks under the impact of a human body thrown thereagainst the glass will divide into small substantially noncutting fragments.

The above-stated objects according to the invention are achieved by an article of glass which has been chemically tempered to create tensile stresses in an internal zone of the glass and compressive stresses in external layers thereof and wherein, for at least a portion of the article, the product of the thickness of the internal zone in tension, in millimeters, and of the maximum tensile stress in such zone, in terms of optical birefringence retardation per unit of length, in millimicrons per millimeter, is between 10 and 140 millimicrons.

DESCRIPTION OF THE PREFERRED EMBODIMENTS

The invention basically involves an article of glass which has been tempered by a chemical tempering process involving an exchange of alkali metal ions in surface layers of the glass by larger alkali metal ions whereby tensile stresses are created in an internal zone of the glass and compressive stresses are created in external layers thereof by an amount such that, for at least part of the article, the product of the thickness, in millimeters, of the internal zone which is in tension and of the maximum tensile stress, expressed in terms of optical birefringence retardation in millimicrons per unit of length in millimeters is between 10 and 140 millimicrons.

The expression of tensile stress in terms of optical birefringence retardation per unit of length is defined as follows.

The optical retardation of light due to birefringence is a known phenomenon and is made use of in the photoelastic stress analysis of glass and other materials. If a light ray is directed onto an edge of a tempered sheet of glass, the glass exhibits a double refracting property and the incident light ray separates into two plane polarized rays travelling in the same direction, but with their electric vectors in different planes, the electric vector of one ray being in a plane parallel with the sheet surfaces and the electric vector of the other ray being in a plane perpendicular to such surfaces. Stresses acting in planes perpendicular to the sheet surfaces are substantially nil. The retardation of one of the plane polarized rays with respect to the other, on emergence from the glass sheet, constitutes a measure of the stresses in the sheet.

The relative retardation can be expressed in terms of the difference in the distances travelled by the two polarized rays at the moment when the more rapid ray emerges and this retardation will be proportional to the distance travelled by the rays through the glass and to the magnitude of the stresses parallel to the sheet surfaces in the plane of one of the electric vectors of the two rays. For the purpose of determining whether the glass sheet fulfills the requirements of the invention as hereinbefore defined, the relative retardation is measured in millimicrons of difference between the waves per millimeter of distance travelled by the faster wave. The relative retardation in a glass sample can be measured, for example, with the aid of a calibrated "Berek Compensator," the sample and the compensator being placed between a polarizer and a light analyzer.

In a tempered sheet of glass, the maximum tensile stress exists in the midplane of the sheet and the tensile stress falls away to zero between that midplane and the subsurface planes of the sheet beyond which the compressive stresses begin to appear. By making successive measurements of relative optical retardation at different depths from the external surfaces of the sheet the positions of the planes in which the stresses are zero can be determined and from that data the thickness of the internal zone in which the glass is in tension can be computed. For the purposes of making the calculation required for determining whether the glass sheet fulfills the requirements of the invention as hereinbefore defined, this thickness is measured in millimeters. For convenience, the symbol $B$ will be used to indicate relative retardation measured in millimicrons per millimeter and the symbol $b$ will be used to indicate the thickness, measured in millimeters, of the internal zone wherein the glass is in tension.

It has been found that if a glass sheet according to the invention is ruptured by the impact of a large mass approximating the effect of a person being thrown head first against a vehicle windshield, the sheet will divide into numerous very small fragments, whereas if the glass sheet ruptures under the impact of a projectile simulating the effect of a small stone thrown against a windshield from a road surface, the sheet will divide into pieces of larger size such that the windshield retains a satisfactory degree of transparency.

Preferably the result of the chemical tempering is such that the product $Bb$ is between 25 and 80 millimicrons. This range optimizes the advantages cited above. The size of the pieces into which the glass divides in the case of impact of stones tends to be larger if the glasses have $Bb$ values in this range than when such values exceed this range.

It is advantageous for the $b$ value, representing the thickness of the interior zone in which the glass is in tension, not to exceed 3 mm. in thickness. The advantage of satisfying this condition is that the sheet will have appreciable flexibility. In the case of a vehicle windshield, flexibility is important because if the screen flexes under a given impact force the risk of the screen breaking is thereby reduced. Moreover, sheets in which the $b$ value is 3 mm. or less form windshields which are light in weight as compared with conventional windshields having the same surface dimensions.

A sheet according to the invention can be combined with one or more other sheets to form an assembly and the other sheet or at least one of them may also be a glass sheet according to the invention. The invention includes any such assembly.

According to certain advantageous embodiments of the invention, the assembly comprises two or more sheets of glass at least one of which is a sheet according to the invention as hereinbefore defined, and a sheet of thermoplastic material, for example polyvinylbutyral. The two glass sheets may be secured to opposite sides of the plastic sheet. In the event of breakage of a glass sheet, the plastic sheet serves to retain pieces of glass which might otherwise become displaced.

A sheet or assembly according to the invention may be used as a, or part of a, door. Clear glass doors are somewhat dangerous because they often can not be easily seen. If a person should inadvertently walk into or collide with such a door the risk of injury is considerably increased if the glass breaks. This additional risk is reduced or avoided if the door comprises a sheet of glass according to the invention, or comprises an assembly according to the invention in which there are two glass sheets secured to an intermediate plastic sheet. In either case the fragments of glass into which the glass divides in the event of breakage have little or no tendency to cut and in the case of an assembly the glass fragments are held more securely in place by virtue of the presence of the intermediate plastic sheet.

A sheet of glass or an assembly according to the invention may be used as a, or part of a, window. Glass windows are a potential source of danger, particularly high windows over pedestrian footways. The risk of personal injury in the event the window should break is reduced by making use of a glass sheet or an assembly according to the invention.

The invention is particularly beneficial when applied to vehicle windshields and the invention includes any such windshield comprising a sheet of glass or an assembly according to the invention as hereinbefore defined. In the case of a windshield formed of such an assembly, the plastic sheet serves to hold in place glass fragments which might otherwise become displaced and possibly hit an occupant of the vehicle. Moreover, when such an assembly is used there is little risk of a person being thrown through the windshield in the event of a collision, even if the glass sheets become broken. The windshield is much more resistant to penetration by the head of an occupant under crash conditions than is a conventional laminated windshield composed of untempered glass sheets.

According to a preferred feature, the glass according to the invention is a soda-lime glass which has been chemically tempered by replacing sodium ions in external layers of the glass with potassium ions, the occurrence of such replacement being evidenced by the fact that the external layers contain a lower concentration of sodium ions and a higher concentration of potassium ions than does the internal zone between such layers. Indeed the content of potassium ions in the internal zone may be nil.

The invention is useful, however, with other types of glasses, e.g., borosilicate glasses.

By way of example, a glass article can be tempered to a condition according to the invention for which the product $Bb$ is between 10 and 140 millimicrons in the following manner: the article is placed in a bath of acid, for example an aqueous bath containing from 1 to 20 percent by weight of hydrofluoric acid and from 0 to 20 percent by weight of sulphuric acid and having a temperature of 0° to 50° C., for a period from 10 to 200 minutes. The article is then immersed in a bath of potassium nitrate containing 0.2 percent by weight of potassium carbonate, the bath being maintained at a temperature between 420° and 500° C. While the article is immersed, $CO_2$ is blown through the bath. This treatment is continued for so long as is required to bring the $Bb$ value to between 10 and 140 millimicrons. The period involved may for example be from 2 to 160 hours according to the specimen and working conditions. Such treatments may be given to glasses of a wide range of compositions, provided they contain sodium or lithium ions. The treatment is advantageous for soda-lime or other silicate glasses, borosilicate glasses, phosphate glasses and so on.

$Bb$ values can be measured as explained above on the specimens themselves if these are for example pieces of flat glass. If the article is not such a piece of flat glass, for example in the case of a bottle, or if its dimensions are too large to permit an easy determination of $Bb$ as explained above, it is possible to measure these values on flat test specimens of small dimensions made of the same glass composition, having the same thickness as the article, and being treated together with the article. It is also possible to measure $Bb$ values for an article by measuring this value on a separate piece taken from the article. It is also possible for the measurements to use instruments which instead of using a beam incident upon the edge of the sheet, use a beam which is incident upon one face of the sheet at a given angle different from zero.

The following are more specific examples of the invention

EXAMPLE I

A series of sheets of four different soda-lime glasses having the compositions, in percent by weight, set out in TABLE I were chemically tempered and then subjected to impact resistance tests and their breaking behavior was studied.

TABLE I

|  | I | II | III | IV |
|---|---|---|---|---|
| $SiO_2$ | 76 | 73 | 71 | 72 |
| $Na_2O$ | 12 | 14 | 14 | 10 |
| CaO | 10 | 10 | 15 | 15 |
| $Al_2O_3$ | 2 | 3 | — | 3 |

The glass sheets were rectangular and measured 140×60 cm. Their thickness was 4 mm.

The glass sheets were treated in the following manner: after grinding, or bevelling, the edges and washing, the sheets were immersed for 1 hour in an aqueous bath containing 7 percent by volume of hydrofluoric acid and 7 percent by volume of sulphuric acid and maintained at a temperature of 20° C. The sheets were then divided into 11 different groups each comprising sheets of only one of the four glass compositions and the groups of sheets were subsequently immersed for a period of between 1 hour and 240 hours in a bath of potassium nitrate at 460° C. and containing 0.2 percent by weight of potassium carbonate while $CO_2$ and air were blown through the bath. In this treatment chemical tempering took place as a result of ion exchange.

Different treatment periods within the said range of 1 to 240 hours were employed for treating the different groups of sheets. Together with each group of sheets, small pieces measuring 1 cm. × 1 cm. × 4 mm. of glass of the same composition as the sheets of that group were subjected to the ion exchange treatment in question. The small pieces (reference specimens) were subsequently subjected to birefringence tests to determine the $Bb$ value for the glass sheets of the related groups.

Sheets of glass in each group were subjected to breakage tests in which stone chips were projected at a speed which was progressively increased from one test to the next. The stone chips weighed 1 to 2 grams. For each group note was taken of the lowest chip speed at which sheets of that group broke. In order to determine the type of fragmentation under the same circumstances for all groups, the same chip speed is used for one specimen of each group, this speed being equal to the speed for which the specimen of the most resistant group breaks. In this test the size of the glass fragments into which the sheet divided was noted. In a last test, a dummy weighing 10 kg. was allowed to fall on one marginally supported sheet of each group from a height of 3 meters, which was sufficient for breaking the toughest sheets.

The results of these tests are set out in TABLE II.

TABLE II

| Group No. | Glass Composition | Product $Bb$ (millimicrons) | Speed of chips causing breakage (m./sec.) | Fragmentation by chip | Fragmentation under impact of dummy (fall 3 meters) |
| --- | --- | --- | --- | --- | --- |
| 1 | III | 15 | 30 | large | small |
| 2 | I | 130 | 30 | large | small |
| 3 | III | 150 | 30 | small | small |
| 4 | II | 8 | 40 | large | large |
| 5 | II | 55 | 40 | large | small |
| 6 | III | 50 | 40 | large | small |
| 7 | I | 180 | 40 | small | small |
| 8 | II | 195 | 40 | small | small |
| 9 | IV | 30 | 40 | large | small |
| 10 | I | 70 | 40 | large | small |
| 11 | II | 45 | 40 | large | small |

The fragmentation is considered large if the mean area of the major surfaces of the fragments disposed around the center of impact in a circular zone 20 cm. in diameter, was 10 cm.$^2$ or more, and small if the mean value was below 10 cm.$^2$. The fragments are also considered large if the fragmentation is limited and in the form of a star around the zone of impact.

It is to be noted that the better fragmentation, i.e., a fragmentation into large pieces under the impact of a chip and into small pieces under an impact by the dummy, occurs when the product $Bb$ is in the range 10 to 140 millimicrons (Groups 1,2,5,6,9,10,11).

EXAMPLE II

The ion exchange treatments employed in EXAMPLE I were applied to 14 other groups of sheets of composition No. III of EXAMPLE I. The sheets were 4.00 mm. in thickness.

Stone chip projection tests were carried out similar to those employed in EXAMPLE I. It was observed that for specimens with $Bb$ values between 25 and 80 millimicrons when the sheets broken under the impact of a chip having an impact speed of 60 meters/sec., the fragmentation was large.

EXAMPLE III

A comparison was made between two series of glass sheets of composition II in EXAMPLE I, the sheets measuring 70 cm. × 70 cm. The first series of sheets had a thickness of 4 mm. and the second a thickness of 1.5 mm. All the sheets of glass were treated according to the method described in EXAMPLE I.

TABLE III gives in the successive columns the number of the specimen, its thickness, the product $Bb$, and the height of fall necessary for breaking the glass with the dummy:

TABLE III

| No. | Thickness (mm.) | $Bb$ (millimicrons) | Height of fall (m.) |
| --- | --- | --- | --- |
| 1 | 1.5 | 20 | 2 |
| 2 | 4 | 20 | 3 |
| 3 | 1.5 | 40 | 1.5 |
| 4 | 4 | 40 | 2 |
| 5 | 1.5 | 55 | 1 |
| 6 | 4 | 55 | 1.6 |
| 7 | 1.5 | 70 | 0.8 |
| 8 | 4 | 70 | 1.2 |
| 9 | 1.5 | 90 | 0.5 |
| 10 | 4 | 90 | 1 |

In all cases the fragmentation was "small," as defined in EXAMPLE I. It will be observed that the thin sheets broke under a lower impact than the thick sheets. However, the tensile forces induced by the fall of the dummy from a given height on a glass are smaller for a thick sheet than a thin one. The said forces are inversely proportional to the square of the sheet thickness. When account is taken of this fact it is apparent that some of the impact force on the thin sheets becomes stored in the sheets due to their elastic flexure.

EXAMPLE IV

Four sheets of glass measuring 200 cm. × 200 cm. × 3 mm. were chemically tempered to impart to each of them a $Bb$ value of 45 millimicrons and were then secured to an intervening sheet of "high impact" polyvinylbutyral 0.76 mm. in thickness. The total thickness of such a laminate is thus 14.28 mm. Such laminates can be used as "bulletproof" glazing, e.g., in the windows of jewellers' shops and in banks. Such laminates are lighter in weight than previously known products of comparable strength. The laminates possess a certain elasticity and in the event of breakage of either of the glass sheets such sheet fractures into large pieces which adhere to the plastic interlayer and the laminate remains transparent. When used as a glazing the laminate will continue to deter unauthorized access through the windows even after such breakage has occurred.

EXAMPLE V

Several laminates were produced each composed of two sheets of tempered glass 1.75 mm. and 1 mm., thick, respectively, glued to the opposite faces of a sheet of "high impact" polyvinylbutyral. The products $Bb$ for the glass sheets were 35 and 55 millimicrons, respectively.

The laminates were used as vehicle windshields with the 1.75 mm. glass sheet on the outside in each case.

In carrying out the breakage tests it was observed that when breakage occurred under the impact of stone chips, the fragmentation was into large pieces none of which became detached from the plastic sheet.

When breakage occurred under the impact of a dummy on the internal face of the windshields, fragmentation was into small pieces, and the head of the dummy did not pass through the windshields, which thus functioned as a safety net. In the tests with the dummy, the sheets of glass fractured into pieces having a mean surface area of less than 4 cm.$^2$ and having only slight cutting properties.

It will be understood that the above description of the present invention is susceptible to various modifications, changes and adaptations.

We claim:

1. An article of glass which has been chemically tempered to create tensile stresses in an internal zone of the glass and compressive stresses in external layers thereof and wherein, for at least a portion of said article, the product of the thickness of the internal zone in tension, in millimeters, and of the maximum tensile stress in such zone, in terms of optical birefringence retardation, per unit of length, in millimicrons per millimeter, is between 25 and 80 millimicrons.

2. An article as defined in claim 1 wherein the stresses therein are due solely to chemical tempering.

3. An article as defined in claim 1 wherein the thickness of the said internal zone is not more than 3 mm.

4. An article as defined in claim 1 constituted by a sheet of soda-lime glass.

5. An article as defined in claim 1 which has been chemically tempered by the replacement of sodium ions in surface layers of the glass with potassium ions.

6. A laminate comprising at least two sheets of glass and at least one sheet of plastic material, wherein one of said sheets of glass is an article defined in claim 1.

7. A laminate as defined in claim 6 wherein said two sheets of glass are secured to opposite faces of said plastic sheet and said plastic sheet is a sheet of polyvinylbutyral.

8. A door constituted at least in part by an article as defined in claim 1.

9. A vehicle windshield constituted by an article as defined in claim 1.

10. A building window constituted by an article as defined in claim 1.

* * * * *